March 1, 1949. M. B. LOWE 2,463,399
COMBINATION HEATING, WELDING, AND CUTTING TORCH
Filed Sept. 5, 1944
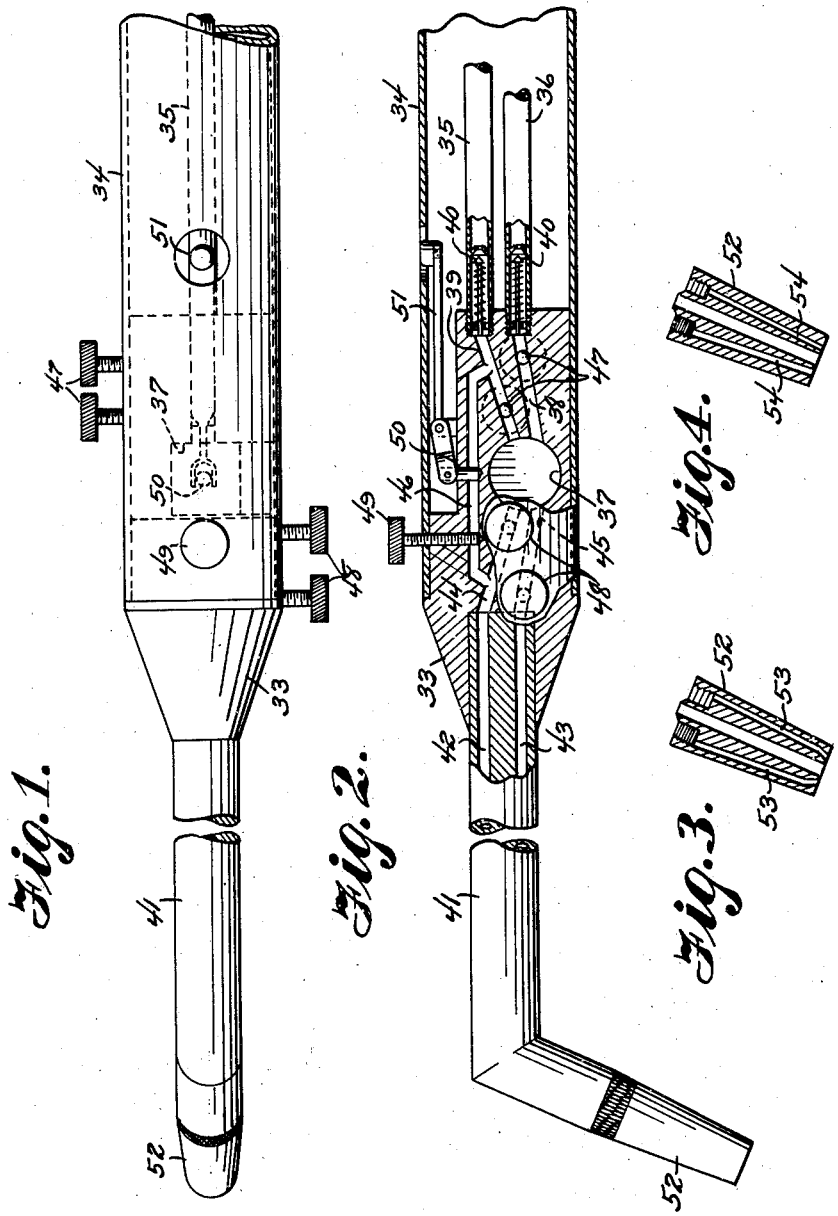
Metcalf B. Lowe INVENTOR.
BY
Victor J. Evans & Co.
ATTORNEYS Patented Mar. 1, 1949

2,463,399

UNITED STATES PATENT OFFICE 2,463,399

COMBINATION HEATING, WELDING, AND CUTTING TORCH

Metcalf B. Lowe, Long Beach, Calif.

Application September 5, 1944, Serial No. 552,795

5 Claims. (Cl. 158—27.4)

1

The invention relates to a torch, and more especially to a welding and cutting torch.

The primary object of the invention is the provision of a device of this character, wherein there is involved a carburetor principle, so that a proper mixture of fluids will be had in the operation of such device, it being a single unit convertible for use in welding, heating, cutting, soldering, lead burning, or may be usable any place where any other torch or combination of torches might be used.

Another object of the invention is the provision of a device of this character, wherein several passages are provided for a perfect mixture of air and gas, in a mixing chamber, and through a special arrangement of valves, the distribution and control of this perfect mixture will be assured, without waste of time, gas, oxygen or air, and avoids the necessity of changing the flame tip for increasing or decreasing the flame.

A further object of the invention is the provision of a device of this character, wherein the required heat is obtainable instantly, and such device can be readily changed, from cutting to welding operation, or vice versa, the said device being novel in construction and unique in the working thereof.

A still further object of the invention is the provision of a device of this character, which is simple in construction, thoroughly reliable and efficient in operation, readily and easily handled, strong, durable, conveniently adjustable with dispatch, instantly convertible and inexpensive to manufacture.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a plan view of the torch with parts broken away.

Figure 2 is a view partly in side elevation and partly in vertical section.

Figure 3 is a longitudinal sectional view through the tip of the device.

Figure 4 is a view similar to Figure 3 showing a slight modification.

Similar reference characters indicate corresponding parts throughout the several views in the drawings.

Referring now to the drawings wherein like reference characters denote corresponding parts,

2 the welding and cutting torch of this invention is formed with a body section 33 which is partially enveloped in the outer end of the aft tubiform casing or housing 34 enclosing side-by-side fluid supply tubes 35 and 36, respectively, the body section 33 being formed with a mixing chamber 37, into which open at one side thereof the passages 38 and 39, respectively, leading from the said tubes 35 and 36, these having next thereto the spring controlled return check valves 40.

The body section 33 at its outer end has socketed therein the outer nozzle section 41, having the side-by-side passages 42 and 43, respectively, which at their inner ends communicate with the passages 44 and 45, respectively, formed in the body section 33 at the side opposite the passages 38 and 39, these passages 44 and 45 being in communication with the chamber 37. In this body section 33 there is provided a by-pass 46, establishing communication between the passages 38 and 44 independently of their communication with the chamber 37.

The body section 33 through the casing or housing 34 in opposite sides thereof has adjustably threaded therein control valves 47 and 48, respectively, in pairs, one of one pair 47 intersecting the passage 38, and the other of this pair intersecting the passage 39, while the one of the other pair 48 intersects the passage 44, and the other of this pair intersects the passage 45, to regulate and cut-off, the supplies of fluids therein.

The by-pass 46 has intersecting the same an adjustable valve 49 tapped in the body section 33 and accessible from without the same. Also this by-pass 46 is intersected by a trigger needle valve 50, its trigger 51 being hand operated and is accessible from without the casing or housing 34, as is clearly shown in Figure 2 of the drawings.

The nozzle section 41 has detachably fitted thereto at its outer end a flame tip 52, and such may be of the detail construction as shown in Figures 3 and 4, having the converging passages 53 and 54, respectively.

The valves 40 function as pressure equalizer check valves in the working of the torch.

This device A is an oxygen and acetylene, city gas and compressed air, acetylene gas and compressed air, single unit cutting and welding torch, it being designed to be an economical mixing torch. First; to save oxygen, acetylene gas and compressed air by incorporating the welding and cutting feature into one single unit to do the work of two torches and arranging a valve system so it is possible, not only to make one torch do the work of two but also to make the one torch adjustable to save acetylene gas and oxygen and also to make the torch versatile, so that it will use as well as the oxygen acetylene combination, city gas and compressed air and acetylene gas and compressed air or oxygen and city gas. Secondly; to save time, it eliminates the necessity for two torches by combining the cutting and welding torches into one, thus saving the time of putting on and taking off cutting or welding attachments, there being no changing of tips, to obtain a larger or smaller flame, as one properly designed tip will handle a wide range of jobs, this being had by turning the mixture flame up or down by a single valve.

What is claimed is:

1. A device of the kind described, comprising a body section having a mixing chamber with a pair of supply passages on one side of the mixing chamber and a pair of outlet passages on the opposite side thereof, valves in the body section intersecting the passages and positioned on opposite sides of the mixing chamber, a nozzle on the body section having passages communicating with the outlet passages leading from the mixing chamber, a tip on the nozzle having a central passage communicating with one of the outlet passages and provided with a plurality of passages positioned around the central passage and communicating with the other outlet passage of the nozzle, and check valves positioned in the supply passages leading to the mixing chamber, said body section having a by-pass passage providing communicating means between one of the supply passages and one of the outlet passages.

2. A device of the kind described, comprising a body section having a mixing chamber with a pair of supply passages on one side of the mixing chamber and a pair of outlet passages extending from the opposite side of the chamber, valves in the body section intersecting the supply and outlet passages on the opposite sides of the mixing chamber, a nozzle on one end of the body section having a pair of passages communicating with the outlet passages, a tip on the nozzle having a central passage communicating with one of the outlet passages and having a plurality of passages positioned around the central passage, concentric therewith, and communicating with the other of said outlet passages, check valves in said supply passages, a by-pass providing communicating means between one of the supply passages and one of the outlet passages and a valve positioned in the said by-pass.

3. A device of the kind described, comprising a body section having a mixing chamber with a pair of supply passages on one side of the mixing chamber and a pair of outlet passages extending from the opposite side of the chamber, valves in the body section intersecting the supply and outlet passages on the opposite sides of the mixing chamber, a nozzle on one end of the body section having a pair of passages communicating with the outlet passages, a tip on the nozzle having a central passage communicating with one of the outlet passages and having a plurality of passages positioned around the central passage, concentric therewith, and communicating with the other of said outlet passages, a by-pass providing communicating means between one of the supply passages and one of the outlet passages and a valve positioned in the said by-pass.

4. In a cutting and welding torch, the combination, which comprises, a body section having a centrally disposed mixing chamber therein, with a pair of supply passages leading from one end into said mixing chamber, a pair of outlet passages extending from the mixing chamber to the opposite end thereof, and a by-pass passage providing communicating means between one of the supply passages and one of the outlet passages, valves in the said supply and outlet passages, a handle having a pair of passages therethrough communicating with the supply passages of the body section and extending from one end thereof, a nozzle having a pair of passages therethrough communicating with the outlet passages extending from the body section, and an angularly disposed tip on said nozzle having a centrally disposed passage communicating with one of the said outlet passages and a plurality of small passages around the central passage, concentric therewith, and communicating with the other of said outlet passages.

5. A cutting and welding torch, as described in claim 4 having a thumb lever actuated valve in said by-pass connection.

METCALF B. LOWE.

REFERENCES CITED

The following references are of record in the file of this patent:

UNITED STATES PATENTS

| Number | Name | Date |
| --- | --- | --- |
| 1,139,959 | Fauscek | May 18, 1915 |
| 1,247,790 | Carlson | Nov. 27, 1917 |
| 1,280,420 | Dibble | Oct. 1, 1918 |
| 1,481,535 | Burdett | Jan. 22, 1924 |
| 1,642,153 | Kemp | Sept. 13, 1927 |
| 1,709,886 | Smith et al. | Apr. 23, 1929 |
| 1,835,845 | Campbell | Dec. 8, 1931 |
| 2,151,443 | Ruch | Mar. 21, 1939 |
| 2,210,402 | Gaines | Aug. 6, 1940 |
| 2,348,111 | Crowley | May 2, 1944 |